A. F. RENKEN.
GOPHER TRAP.
APPLICATION FILED JUNE 26, 1915.
1,167,218.
Patented Jan. 4, 1916.
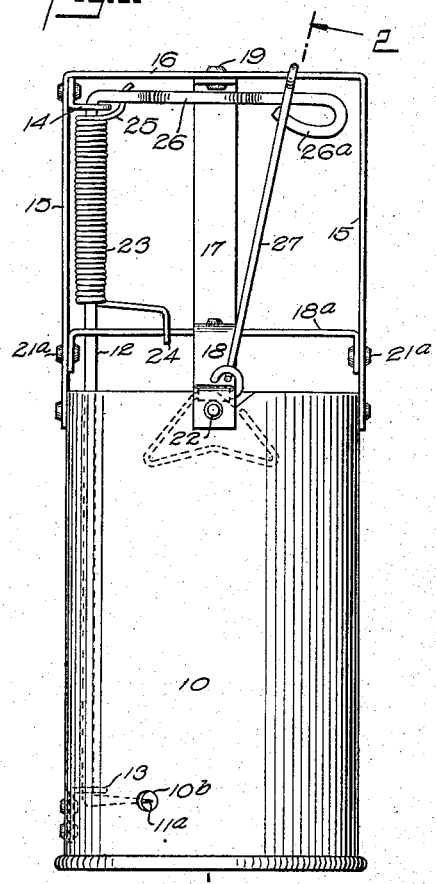
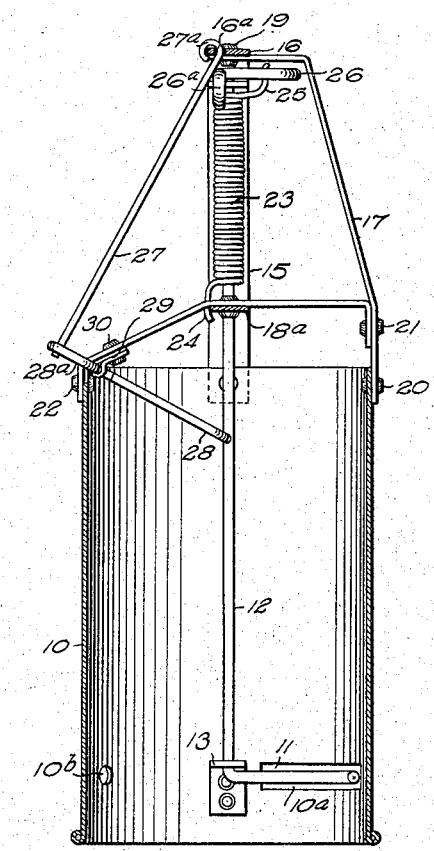
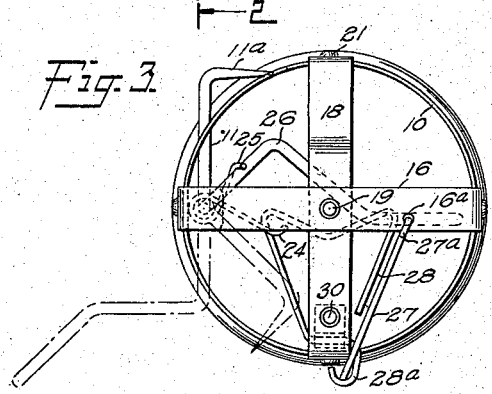
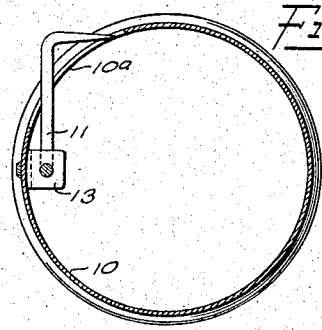
WITNESSES
George L. Blume.
INVENTOR
Anton F. Renken.
BY
ATTORNEYS

UNITED STATES PATENT OFFICE.

ANTON F. RENKEN, OF KRAMER, NEBRASKA.

GOPHER-TRAP.

1,167,218.   Specification of Letters Patent.   Patented Jan. 4, 1916.

Application filed June 26, 1915. Serial No. 36,490.

*To all whom it may concern:*

Be it known that I, ANTON F. RENKEN, a citizen of the United States, and a resident of Kramer, in the county of Lancaster and State of Nebraska, have invented a new and Improved Gopher-Trap, of which the following is a full, clear, and exact description.

My invention relates to traps arranged to be positioned in a gopher burrow, so that upon a gopher passing through the trap, contact with a trigger will release a spring pressed spear.

In my improved trap the spear is formed with a spindle actuated by a torsion spring, the spindle being disposed along a tubular body or frame, and having at one end a spur to spear the gopher and at the opposite end an integral arm to be restrained by a latch adapted to engage a pivoted trigger.

The prime purpose of the novel construction and arrangement is to facilitate the setting of the trap without any danger of injury to the user, while providing a simple and positively acting construction.

The invention will be particularly explained in the specific description following.

Reference is had to the accompanying drawings forming part of this specification, in which similar characters of reference indicate corresponding parts in all the views, and in which:

Figure 1 is a side elevation of a gopher trap embodying my invention; Fig. 2 is a vertical section on the line 2—2 Fig. 1; Fig. 3 is a plan view; and Fig. 4 is a sectional plan view, the section being taken near the lower end of the trap.

In constructing a practical embodiment of my invention in accordance with the illustrated example, a body or shell 10 is provided adapted to be disposed lengthwise in a gopher burrow, so that the gopher may pass therethrough. An impaling spear 11 is laterally disposed in the tubular body 10 and is formed integral with a longitudinally disposed spindle 12 which ranges along one side of the body at the interior and is adapted to turn in a bearing bracket 13 at one end of the body 10, there being a similar bearing bracket 14 secured to a frame at the front of the body 10.

The frame designated generally by the numeral 15, presents longitudinally disposed bars at diametrically opposite sides which are integral with the front cross-bar 16. A brace bar 17 is provided extending from the cross-bar 16 to the front end of the body 10 as well as a pair of cross-bars 18, 18$^a$ at approximately right angles to each other and positioned adjacent to the front of the body 10 inward from the cross-bar 16. The brace 17 is connected at its front end by a rivet 19, or other suitable means to the cross-bar 16 and united at its inner end as at 20 to the body 10. The cross-bar 18 is secured at one end by a rivet 21 to the brace bar 17 and at its opposite end as at 22 to the body 10. The cross-bar 18$^a$ as shown is secured by rivets 21$^a$ to the opposite side arms 15.

A torsion spring 23 surrounds the spindle 12 near the upper end and one end 24 of said spring bears against a cross-bar 18$^a$ or other fixed portion of the trap, while the opposite end 25 lies against a lateral arm 26 in fixed relation to the spindle 12 at the front end. The tendency of the spring 23 is to turn the spindle 12 on its own axis to carry the spear 11 from the set position alongside the wall of the body 10 through a sufficient angle to carry the spur 11$^a$ of the spear through the path traversed by the gopher. The spur 11$^a$ is at approximately right angles to the transversely disposed body 11 of the spear and said spur when in the set position is disposed at an oblong slot 10$^a$ in the body 10 so that the point of the spear is outside of or close to the adjacent inner surface of the body 10. When the spur 11$^a$ is moved under the influence of the spring 23, the point thereof is adapted to pass through a transverse hole 10$^b$ in the body 10 distant from the oblong slot 11, so that in impaling the gopher the spear 11 and the spur 11$^a$ will pin the gopher against the side wall of the body.

A latch 27 is loosely pivoted to the cross-bar 16, a convenient arrangement being the provision of an eye 27$^a$ on the said latch which engages an eye 16$^a$ in the said cross-bar 16. The free end of the latch 27 is adapted to engage with a loop or equivalent formation 28$^a$ on a trigger 28, said trigger being preferably formed of wire to give a broad effective area, and the inner end being positioned within the body 10 and extending partially across the same. The pivotal mounting of the trigger 28 may be by means of a strap 29 riveted as at 30 to the cross-bar 18. Any desired form may be given the trigger 28 so as to provide an effective surface to insure contact of the animal therewith.

It will be seen that the integral formation of the spindle 12, spear 11, and arm 26 provides for the safe and convenient setting of the trap without danger to the user, and that the other elements make for convenience and efficiency, in that the front frame structure provides the necessary members for the support of the spindle 12 and the latch 27 as well as for the engagement of the spring arm 24. The form and arrangement of the spear and the slotted and apertured shell result in affording a clear passage for the gopher toward the trigger and an effective pinning of the speared gopher. Also, it will be observed that the disposition of the spear in the set position outside of the interior space of the shell is provided for without the said spear presenting any material projection at the exterior, the resulting compactness being desirable in disposing the trap in the burrow. Furthermore, the trap will thus occupy the minimum total cross-sectional area.

Having thus described my invention, what I claim as new and desire to secure by Letters Patent, is:

1. A trap comprising a tubular body, a spindle disposed longitudinally of the body and mounted to rock, said spindle having a transverse spear thereon at its rear end and with an integral lateral arm at the opposite end, a frame on the tubular body at the front, a trigger mounted on the body at the front, a latch mounted on the frame and extending at one side of the lateral arm of the spindle, said latch detachably engaging the trigger, and a torsion spring surrounding the spindle, one end of the spring being engaged with a fixed part of the trap and the other bearing against the lateral front arm of the spindle, the said spear having a spur at approximately right angles thereto and the said body at the rear end having a slot through which the spur and the adjacent portion of the spear may extend and having also an aperture distant from the said slot through which the spur may be projected under the influence of the said spring.

2. A trap of the character described, comprising a tubular body adapted to be disposed in a burrow and constituting a passageway for a gopher, a spindle ranging longitudinally at the interior of the body and rockably mounted, said spindle having a laterally disposed spear at its rear end, and a lateral arm at its front end, a spring normally tending to turn said spindle to throw the spear through an angle transversely of the body, a trigger pivotally mounted on the body and having a member projecting into the body to be engaged by an animal passing through the latter, and a pivoted latch extending at one side of the said lateral arm of the spindle and having its free end engaging the trigger.

3. A trap comprising a tubular body having adjacent one end a slot and an opening spaced from said slot, a frame secured to one end of the body, a spindle journaled in the body and frame and provided at the end within the body with a lateral arm having an angular spear member and at its other end with a lateral arm, a spring surrounding the spindle and having one end secured to the frame and its other end engaging the arm of the spindle, a latch pivoted to the frame above the arm of the spindle and extending at one side of the arm of the spindle, and a trigger pivoted between its ends and having one member thereof extending into the body, the other member of the trigger having a loop with which the free end of the latch engages.

In testimony whereof I have subscribed my name to this specification in the presence of two subscribing witnesses.

ANTON F. RENKEN.

Witnesses:
JOSEPH KLEIN,
F. A. THOMPSON.

Copies of this patent may be obtained for five cents each, by addressing the "Commissioner of Patents, Washington, D. C."